United States Patent
O'Brien et al.

(10) Patent No.: US 12,211,326 B2
(45) Date of Patent: Jan. 28, 2025

(54) SYSTEMS AND METHODS FOR DIGITAL TWIN FOR CONDITION BASED MAINTENANCE

(71) Applicant: Honeywell International Inc., Charlotte, NC (US)

(72) Inventors: Mitchell O'Brien, Phoenix, AZ (US); Steven Ackerman, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 232 days.

(21) Appl. No.: 17/930,664

(22) Filed: Sep. 8, 2022

(65) Prior Publication Data
US 2024/0087373 A1    Mar. 14, 2024

(51) Int. Cl.
*G07C 5/08* (2006.01)
*B64D 47/00* (2006.01)

(52) U.S. Cl.
CPC ............ *G07C 5/0808* (2013.01); *B64D 47/00* (2013.01)

(58) Field of Classification Search
CPC .................................................. G07C 5/0808
See application file for complete search history.

(56) References Cited

U.S. PATENT DOCUMENTS

| | | | |
|---|---|---|---|
| 10,604,278 B2* | 3/2020 | Adibhatla | F01D 21/14 |
| 10,826,932 B2* | 11/2020 | Abbaszadeh | G06N 5/04 |
| 11,417,154 B1* | 8/2022 | Moeykens | G06F 21/32 |
| 2022/0374402 A1* | 11/2022 | Hawkins | G06F 16/215 |
| 2023/0145526 A1* | 5/2023 | Holtz | H04L 41/145 |
| | | | 700/44 |
| 2024/0087373 A1* | 3/2024 | O'Brien | G05B 23/0243 |

* cited by examiner

*Primary Examiner* — Michael A Berns
(74) *Attorney, Agent, or Firm* — ALSTON & BIRD LLP

(57) ABSTRACT

A method may include receiving sensor data from a sensor associated with a component of a vehicle; determining a component scalar of the component using the sensor data and a digital twin model of the component; detecting an abnormality of the sensor associated with the component of the vehicle; based on detecting the abnormality of the sensor, determining an estimated component scalar of the component using the component scalar; and providing the estimated component scalar to the digital twin model of the component.

20 Claims, 10 Drawing Sheets

SYSTEMS AND METHODS FOR DIGITAL TWIN FOR CONDITION BASED MAINTENANCE

TECHNICAL FIELD

The present disclosure relates to systems and methods for determining an estimated component scalar of a component of a vehicle based on detecting an abnormality of a sensor associated with the component of the vehicle.

BACKGROUND

An aircraft includes many disparate systems, such as a flight control system, a landing gear system, a hydraulic system, an electrical system, an engine system, an avionics system, an environmental control system, a fuel system, a propulsion system, etc. These systems respectively include many underlying components, such as valves, pumps, reservoirs, oil coolers, actuators, generators, turbines, etc. During operation of the aircraft, sensors monitor the components, and generate vast amounts of sensor data associated with the components.

Various component metrics of a component (e.g., an engine) may be determined using the sensor data. For example, the sensor data may be used to determine a fault of the component, power loss due to the fault of the component, a remaining useful life of the component, or an overall health of the component. However, the sensor data may be unavailable, or inaccurate, in the event of an abnormality of a sensor. Accordingly, in such cases, the component metrics may be unavailable or inaccurate.

SUMMARY

Embodiments of the present disclosure relate to, among other things, systems and methods for determining an estimated component scalar of a component of a vehicle based on detecting an abnormality of a sensor associated with the component of the vehicle.

As used herein, a "vehicle" may refer to an entity for transporting items, people, passengers, etc. For example, a vehicle be an aircraft, a boat, an automobile, a robot, a train, a satellite, a spacecraft, etc. Moreover, although embodiments herein describe the determination of component scalars of components of vehicles, it should be understood that the embodiments herein are applicable to components of other types of non-vehicular systems, such as factories, buildings, etc.

As used herein, a "component" may refer to a constituent element of a vehicle. For example, a component may be an engine, a subset of an engine, a flight control system, a landing gear system, a hydraulic system, an electrical system, an engine system, an avionics system, an environmental control system, a fuel system, a propulsion system, etc.

As used herein, a "component scalar" may refer to a relative indicator of a particular attribute of a component. For example, a compressor efficiency scalar greater than one indicates the specific compressor is higher in efficiency than the nominal model and conversely a scalar less than one indicates the specific compressor is lower than the nominal model. The relative movement of these component scalars are used to assess the component performance deterioration.

As used herein, a "universal component scalar" may refer to a component scalar that is universal to a particular type of component. As used herein, an "estimated component scalar" may refer to a component scalar that is specific to a particular component, and that is determined using previously-determined (or historical) component scalars of the component.

As used herein, a "component metric" may refer to an indication of a status of a component. For example, a component metric may be a fault of the component, a power loss due to the fault of the component, a remaining useful life of the component, an overall health of the component, etc.

Each of the embodiments disclosed herein may include one or more of the features described in connection with any of the other disclosed embodiments.

According to an example embodiment, a method may include receiving sensor data from a sensor associated with a component of a vehicle; determining a component scalar of the component using the sensor data and a digital twin model of the component; detecting an abnormality of the sensor associated with the component of the vehicle; based on detecting the abnormality of the sensor, determining an estimated component scalar of the component using the component scalar; and providing the estimated component scalar to the digital twin model of the component.

According to an example embodiment, a device may include a memory configured to store instructions; and a processor configured to execute the instructions to perform a method comprising: receiving sensor data from a sensor associated with a component of a vehicle; determining a component scalar of the component using the sensor data and a digital twin model of the component; detecting an abnormality of the sensor associated with the component of the vehicle; based on detecting the abnormality of the sensor, determining an estimated component scalar of the component using the component scalar; and providing the estimated component scalar to the digital twin model of the component.

According to an example embodiment, a non-transitory computer-readable medium may store instructions that, when executed by a processor, cause the processor to perform a method comprising: receiving sensor data from a sensor associated with a component of a vehicle; determining a component scalar of the component using the sensor data and a digital twin model of the component; detecting an abnormality of the sensor associated with the component of the vehicle; based on detecting the abnormality of the sensor, determining an estimated component scalar of the component using the component scalar; and providing the estimated component scalar to the digital twin model of the component.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

Figure 1:
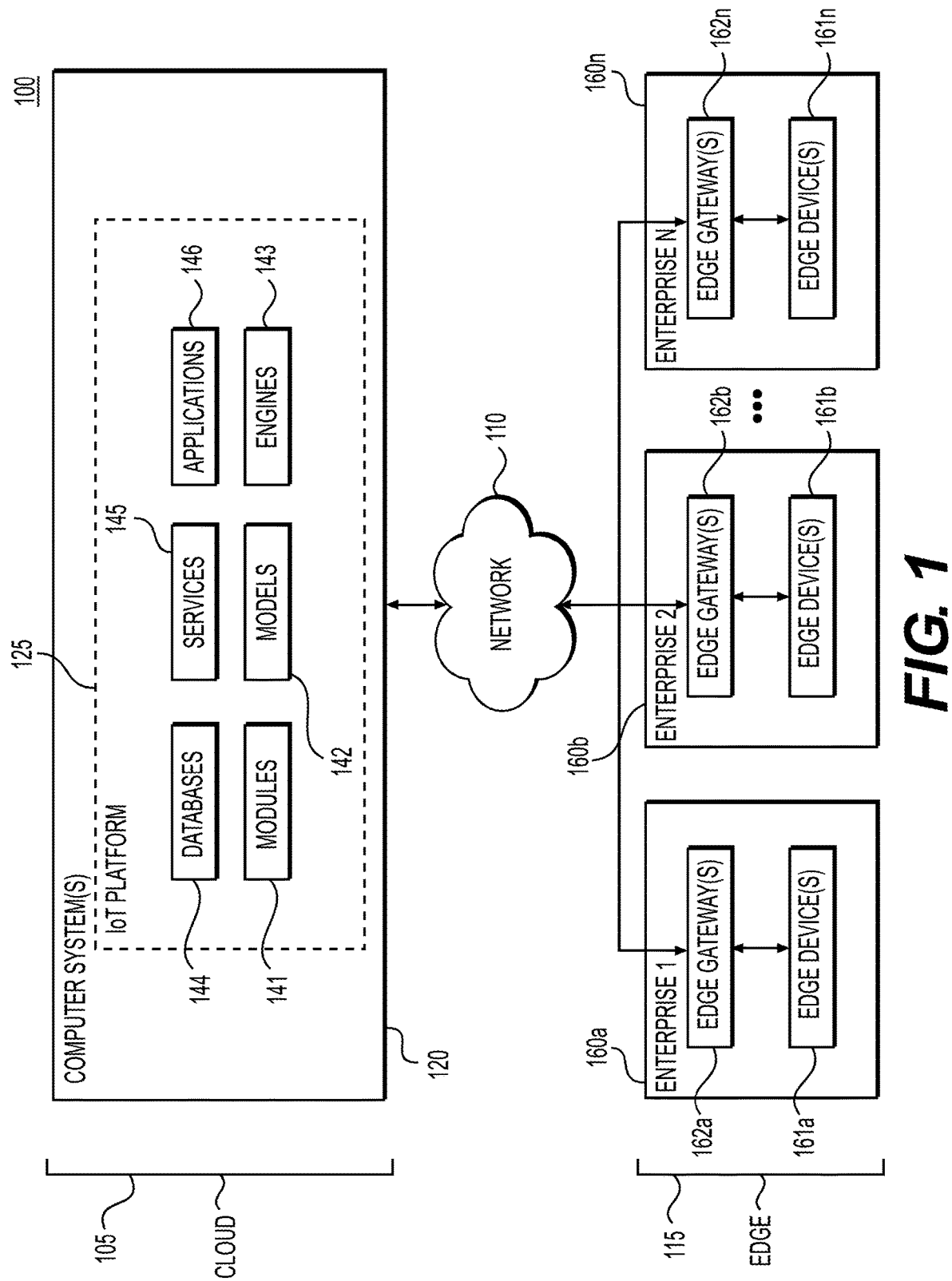
FIG. 1 depicts an exemplary networked computing system environment, according to one or more embodiments.

FIG. 1 illustrates an exemplary networked computing system environment 100, according to the present disclosure. As shown in FIG. 1, networked computing system environment 100 is organized into a plurality of layers including a cloud 105, a network 110, and an edge 115. As detailed further below, components of the edge 115 are in communication with components of the cloud 105 via network 110.

Network 110 may be any suitable network or combination of networks and may support any appropriate protocol suitable for communication of data to and from components of the cloud 105 and between various other components in the networked computing system environment 100 (e.g., components of the edge 115). Network 110 may include a public network (e.g., the Internet), a private network (e.g., a network within an organization), or a combination of public and/or private networks. Network 110 may be configured to provide communication between various components depicted in FIG. 1. Network 110 may comprise one or more networks that connect devices and/or components in the network layout to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 may be implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, computer systems 120 may include any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, the processors and data storage devices may comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, the software components of computer systems 120 may include one or more software modules to communicate with user devices and/or other computing devices through network 110. For example, the software components may include one or more modules 141, models 142, engines 143, databases 144, services 145, and/or applications 146, which may be stored in/by the computer systems 120 (e.g., stored on the memory), as detailed with respect to FIG. 2 below. The one or more processors may be configured to utilize the one or more modules 141, models 142, engines 143, databases 144, services 145, and/or applications 146 when performing various methods described in this disclosure.

Accordingly, computer systems 120 may execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 may be combined to form fewer modules, models, engines, databases, services, and/or applications. In some embodiments, some of the modules 141, models 142, engines 143, databases 144, services 145, and/or applications 146 may be separated into separate, more numerous modules, models, engines, databases, services, and/or applications. In some embodiments, some of the modules 141, models 142, engines 143, databases 144, services 145, and/or applications 146 may be removed while others may be added.

The computer systems 120 are configured to receive data from other components (e.g., components of the edge 115) of networked computing system environment 100 via network 110. Computer systems 120 are further configured to utilize the received data to produce a result. Information indicating the result may be transmitted to users via user computing devices over network 110. In some embodiments, the computer systems 120 may be referred to as a server system that provides one or more services including providing the information indicating the received data and/or the result(s) to the users. Computer systems 120 are part of an entity, which may include any type of company, organization, or institution that implements one or more IoT services. In some examples, the entity may be an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n may represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

Figure 2:
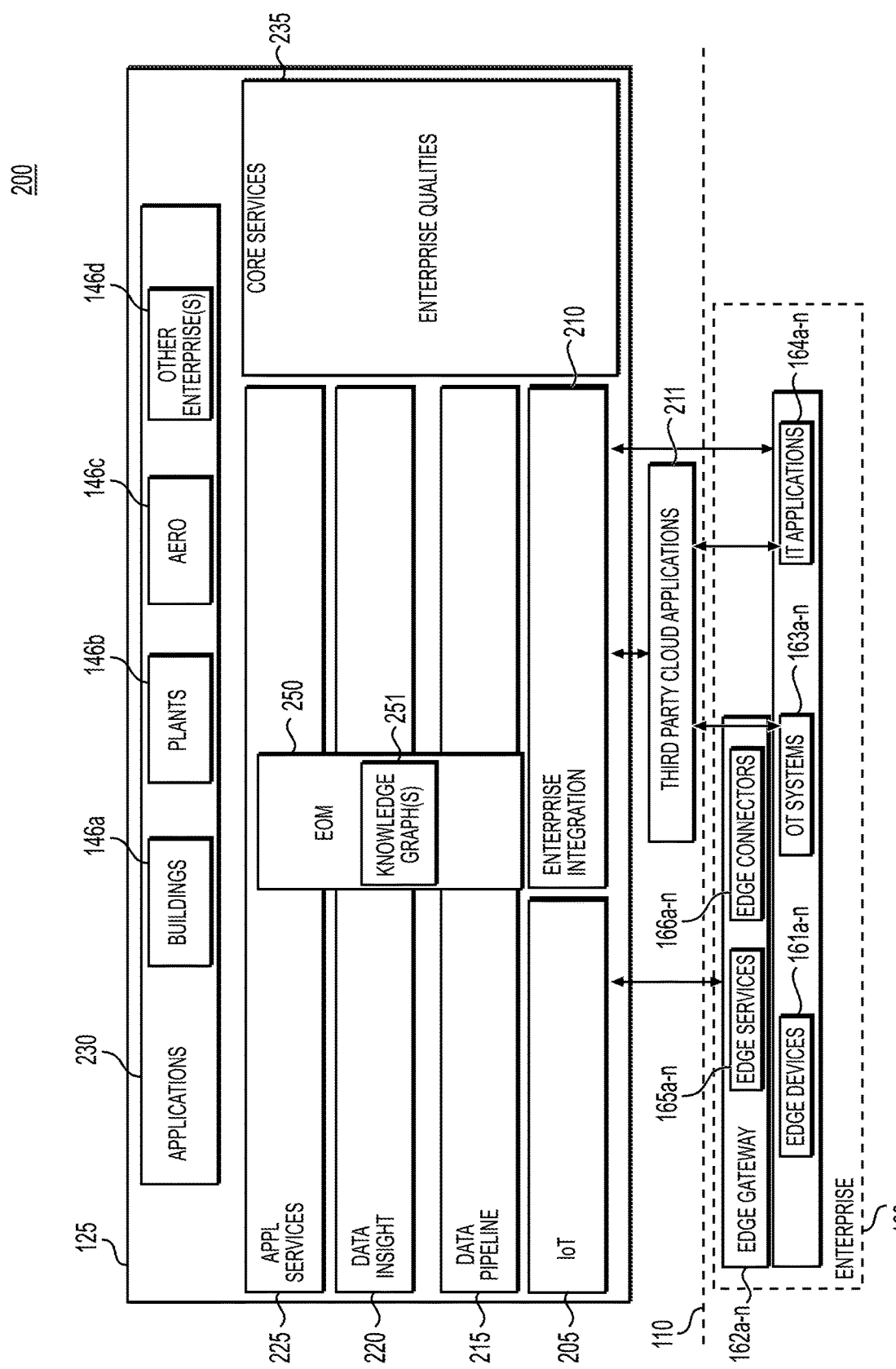
FIG. 2 depicts a schematic block diagram of a framework of an IoT platform of the networked computing system environment of FIG. 1.

The edge devices 161a-161n may represent any of a variety of different types of devices that may be found within the enterprises 160a-160n. Edge devices 161a-161n are any type of device configured to access network 110, or be accessed by other devices through network 110, such as via an edge gateway 162a-162n. Edge devices 161a-161n may be referred to in some cases as "IoT devices," which may therefore include any type of network-connected (e.g., Internet-connected) device. For example, the edge devices 161a-161n may include sensors, actuators, processors, computers, valves, pumps, ducts, vehicle components, cameras, displays, doors, windows, security components, HVAC components, factory equipment, and/or any other devices that may be connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, the edge 115 may also include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. The communication interfaces of the edge gateways 162a-162n may include one or more cellular radios, Bluetooth, Wi-Fi, NFC radios, Ethernet, or other appropriate communication devices for transmitting and receiving information. Multiple communication interfaces may be included in each gateway 162a-162n for providing multiple forms of communication between the edge devices 161a-161n, the gateways 162a-162n, and the cloud 105 via network 110. For example, communication may be achieved with the edge devices 161a-161n and/or the network 110 through wireless communication (e.g., Wi-Fi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

The edge gateways 162a-162n may also include a processor and memory for storing and executing program instructions to facilitate data processing. For example, the edge gateways 162a-162n can be configured to receive data from the edge devices 161a-161n and process the data prior to sending the data to the cloud 105. Accordingly, the edge gateways 162a-162n may include one or more software modules or components for providing data processing services and/or other services or methods of the present disclosure. With reference to FIG. 2, each edge gateway 162a-162n includes edge services 165a-165n and edge connectors 166a-166n. The edge services 165a-165n may include hardware and software components for processing the data from the edge devices 161a-161n. The edge connectors 166a-166n may include hardware and software components for facilitating communication between the edge gateway 162a-162n and the cloud 105 via network 110, as detailed above. In some cases, any of edge devices 161a-n, edge connectors 166a-n, and edge gateways 162a-n may have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160*a*-160*n* using an extensible object model (or "asset model") and knowledge graphs 251 where the equipment (e.g., edge devices 161*a*-161*n*) and processes of the enterprise 160*a*-160*n* are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161*a*-161*n*) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161*a*-161*n*), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161*a*-161*n* of an enterprise 160*a*-160*n*, and the knowledge graphs 251 are input into the EOM 250 for visualizing the models (e.g., the nodes and links).

The models describe the assets (e.g., the nodes) of an enterprise (e.g., the edge devices 161*a*-161*n*) and describe the relationship of the assets with other components (e.g., the links). The models also describe the schema (e.g., describe what the data is), and therefore the models are self-validating. For example, the model can describe the type of sensors mounted on any given asset (e.g., edge device 161*a*-161*n*) and the type of data that is being sensed by each sensor. A key performance indicator (KPI) framework can be used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161*a*-161*n* and the applications 146 that handle those devices 161*a*-161*n*. For example, when new edge devices 161*a*-161*n* are added to an enterprise 160*a*-160*n* system, the new devices 161*a*-161*n* will automatically appear in the IoT platform 125 so that the corresponding applications 146 can understand and use the data from the new devices 161*a*-161*n*.

In some cases, asset templates are used to facilitate configuration of instances of edge devices 161*a*-161*n* in the model using common structures. An asset template defines the typical properties for the edge devices 161*a*-161*n* of a given enterprise 160*a*-160*n* for a certain type of device. For example, an asset template of a pump includes modeling the pump having inlet and outlet pressures, speed, flow, etc. The templates may also include hierarchical or derived types of edge devices 161*a*-161*n* to accommodate variations of a base type of device 161*a*-161*n*. For example, a reciprocating pump is a specialization of a base pump type and would include additional properties in the template. Instances of the edge device 161*a*-161*n* in the model are configured to match the actual, physical devices of the enterprise 160*a*-160*n* using the templates to define expected attributes of the device 161*a*-161*n*. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior.

The modeling phase includes an onboarding process for syncing the models between the edge 115 and the cloud 105. For example, the onboarding process can include a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161*a*-161*n* and determine what the naming conventions refer to. For example, the knowledge graph 250 can receive "TMP" during the modeling phase and determine that "TMP" relates to "temperature." The generated models are then published. The complex onboarding process includes the knowledge graph 250 receiving the raw model data, receiving point history data, and receiving site survey data. The knowledge graph 250 can then use these inputs to run the context discovery algorithms. The generated models can be edited and then the models are published. The standardized rollout process includes manually defining standard models in the cloud 105 and pushing the models to the edge 115.

The IoT layer 205 includes one or more components for device management, data ingest, and/or command/control of the edge devices 161*a*-161*n*. The components of the IoT layer 205 enable data to be ingested into, or otherwise received at, the IoT platform 125 from a variety of sources. For example, data can be ingested from the edge devices 161*a*-161*n* through process historians or laboratory information management systems. The IoT layer 205 is in communication with the edge connectors 165*a*-165*n* installed on the edge gateways 162*a*-162*n* through network 110, and the edge connectors 165*a*-165*n* send the data securely to the IoT platform 205. In some embodiments, only authorized data is sent to the IoT platform 125, and the IoT platform 125 only accepts data from authorized edge gateways 162*a*-162*n* and/or edge devices 161*a*-161*n*. Data may be sent from the edge gateways 162*a*-162*n* to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the assets (e.g., the edge devices 161a-161n). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the asset templates such that when an asset (e.g., edge device 161a-161n) instance is created, any associated calculation instances are also created with their input and output parameters linked to the appropriate attributes of the asset (e.g., edge device 161a-161n).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower level condition may have. There may be multiple fault models for a given enterprise 160a-160n looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what is the best maintenance option and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, BI, machine learning, and/or an API for application services. The application services layer 225 enables building of applications 146*a-d*. The applications layer 230 includes one or more applications 146*a-d* of the IoT platform 125. For example, the applications 146*a-d* can include a buildings application 146*a*, a plants application 146*b*, an aero application 146*c*, and other enterprise applications 146*d*. The applications 146 can include general applications 146 for portfolio management, asset management, autonomous control, and/or any other custom applications. Portfolio management can include the KPI framework and a flexible user interface (UI) builder. Asset management can include asset performance and asset health. Autonomous control can include energy optimization and predictive maintenance. As detailed above, the general applications 146 can be extensible such that each application 146 can be configurable for the different types of enterprises 160*a*-160*n* (e.g., buildings application 146*a*, plants application 146*b*, aero application 146*c*, and other enterprise applications 146*d*).

The applications layer 230 also enables visualization of performance of the enterprise 160*a*-160*n*. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services 235 can include data visualization, data analytics tools, security, scaling, and monitoring. The core services 235 can also include services for tenant provisioning, single login/common portal, self-service admin, UI library/UI tiles, identity/access/entitlements, logging/monitoring, usage metering, API gateway/dev portal, and the IoT platform 125 streams.

Figure 3:
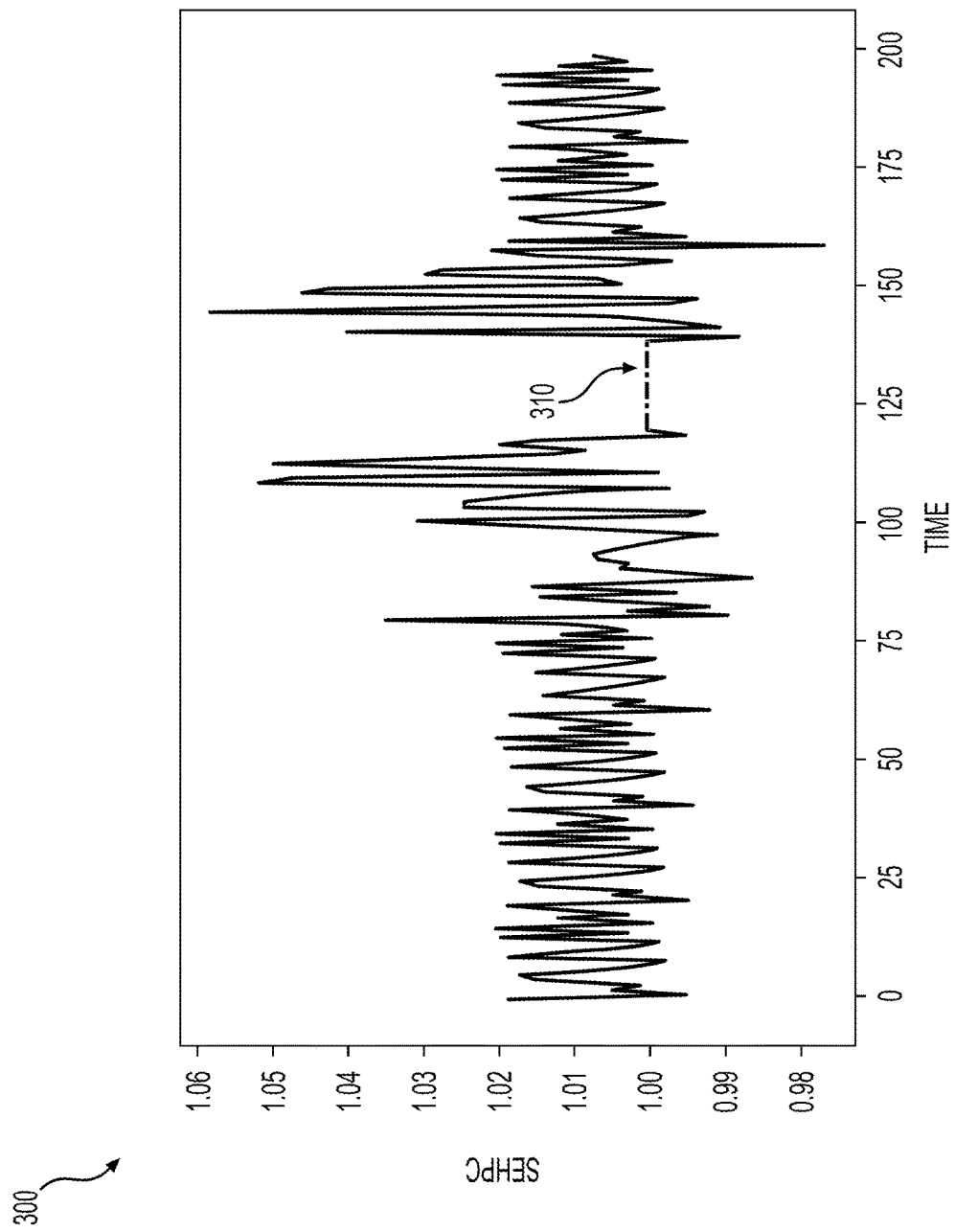
FIG. 3 depicts a diagram of using a universal component scalar in the event of an abnormality of a sensor.
Figure 4:
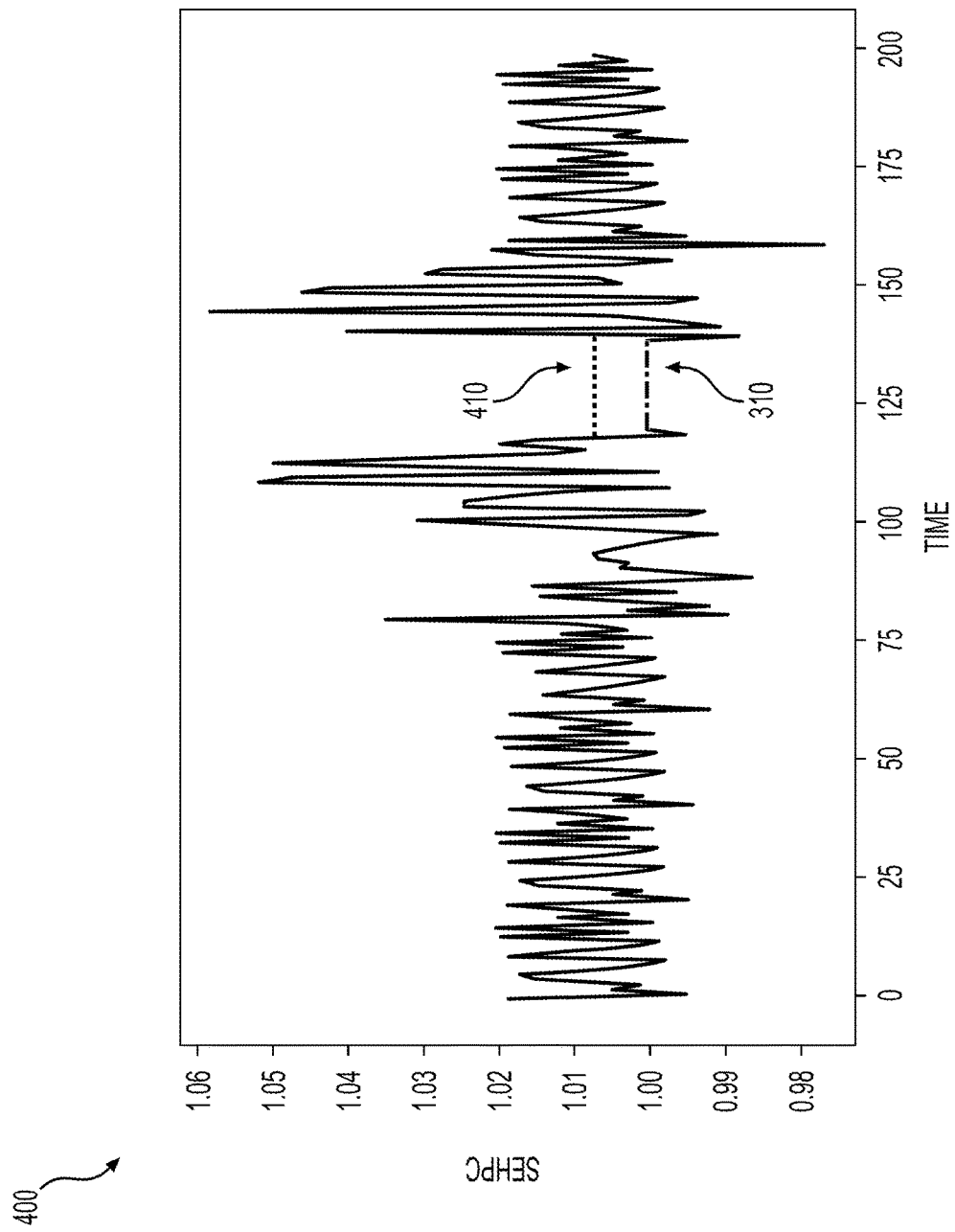
FIG. 4 depicts a diagram of using an estimated component scalar in the event of an abnormality of a sensor.

FIG. 3 depicts a diagram 300 of using a universal component scalar in the event of an abnormality of a sensor. FIG. 4 depicts a diagram 400 of using an estimated component scalar in the event of an abnormality of a sensor. Referring to FIGS. 3 and 4, an analytics device may determine a component scalar (high-pressure compressor efficiency scalar ("SEHPC")) of a component (e.g., an engine) of a vehicle (e.g., an aircraft). For example, the analytics device may receive sensor data associated with the component of the vehicle, and determine the component scalar using the sensor data and a digital twin model of the component. That is, the analytics device may input the sensor data into the digital twin model, and determine the component scalar based on an output of the digital twin model.

Further, in FIGS. 3 and 4, a sensor may be operating normally within a first time frame (time 0 through time 119), may be operating abnormally within a second time frame (time 120 through time 139), and may be operating normally within a third time frame (time 140 through time 200).

In this case, the analytics device may receive sensor data from the sensor within the first time frame and the third time frame, and determine the component scalar using the sensor data and the digital twin model of the component. Generally, the determined component scalar is substantially accurate within the first time frame and the third time frame because the sensor is operating normally.

However, during the second time frame, the sensor may be operating abnormally. Accordingly, sensor data might be unavailable during the second time frame, or might be too inaccurate for usage in determining the component scalar.

As such, and referring to FIG. 3, the analytics device might use a universal component scalar 310 for the second time frame. The universal component scalar might be a component scalar that is universal to the type of component. For example, the universal component scalar might be a component scalar that is applicable to all engines belonging to a specific type of engine. However, in this case, the universal component scalar 310 might not be accurate for the particular component associate with the abnormal sensor. That is, the universal component scalar 310 might not account for variance between components. Accordingly, component metrics that are determined using the universal component scalar 310 might be inaccurate.

Accordingly, as shown in FIG. 4, the present disclosure provides a technique for using an estimated component scalar 410 in the event of an abnormality associated with a sensor. As described in more detail elsewhere herein, the estimated component scalar 410 may be determined using previously-determined component scalars for the component (e.g., historical component scalars). As such, the estimated component scalar 410 may be more accurate than the universal component scalar 310. By using the estimated component scalar 410 instead of the universal component scalar 310, the present disclosure improves accuracy of component metric determination, improves the detection of issues with the component, improves the safety of the vehicle, reduces maintenance associated with the vehicle, etc.

Figure 5:
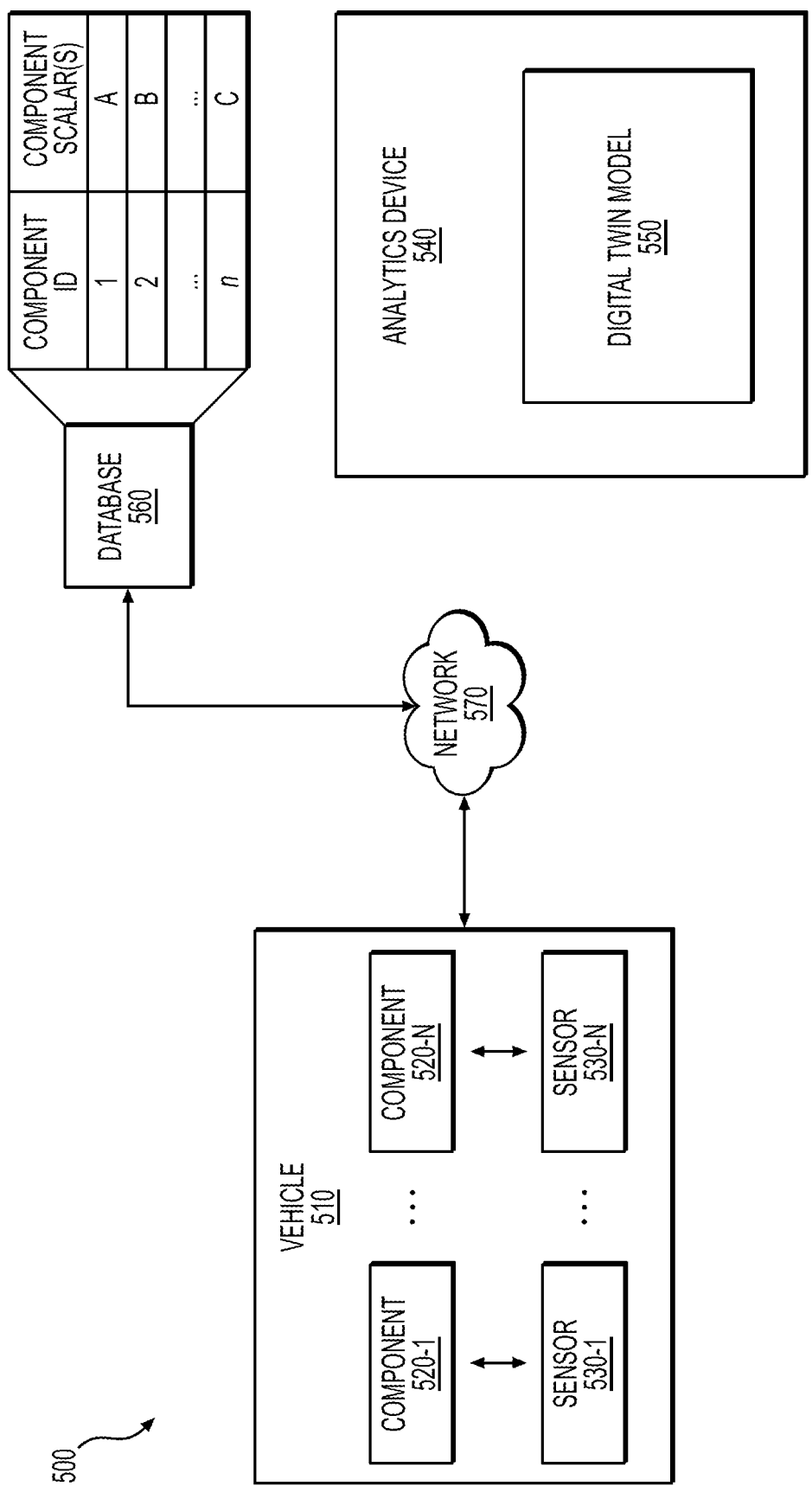
FIG. 5 depicts a diagram of a system for determining an estimated component scalar of a component of a vehicle based on detecting an abnormality of a sensor associated with the component of the vehicle.

FIG. 5 depicts a diagram of a system 500 for determining an estimated component scalar of a component of a vehicle based on detecting an abnormality of a sensor associated with the component of the vehicle. As shown in FIG. 5, the system 500 may include a vehicle 510 having components 520-1 through 520-*n*, and sensors 530-1 through 530-*n*. Further, the system 500 may include an analytics device 540, digital twin model 550, a database 560, and a network 570.

The vehicle 510 may be an aircraft (e.g., an airplane, a helicopter, a shuttle, a drone, etc.), an automobile, a ship, a train, a robot, etc. The component 520 may be a component of any of the systems of the vehicle 510. For example, the component may be a component of a flight control system, a landing gear system, a hydraulic system, an electrical system, an engine bleed air system, an avionics system, an environmental control system, a fuel system, a propulsion system, an ice protection system, a communication system, a navigation system, a monitoring system, a collision-avoidance system, a radar system, an aircraft condition monitoring system, etc. As particular examples, the component may be an engine, a valve, a pump, a reservoir, an oil cooler, an actuator, a generator, an alternator, a circuit, a turbine, a transmitter, a receiver, etc. The sensor 530 may be a vibration sensor, a temperature sensor, a pressure sensor, an electrical sensor, a speed sensor, a fuel sensor, a climate sensor, or the like. The sensor data may be any type of data related to the component 520. For example, the sensor data may be a close time for a flow control valve, a temperature of an engine, an amount of current in an actuator, a pressure of a fuel pump, a bleed flow rate, a duct pressure, a precooler inlet temperature, a valve position, upstream pressure of a valve, downstream pressure of a valve, HPSOV position, engine speed, bleed pressure regulating valve position, precooler inlet temperature, etc.

The analytics device 540 may be a server, a platform, or the like. In some cases, the analytics device 540 may be one or more of the devices shown in FIGS. 1 and 2. The digital twin model 550 may be a model that is configured to obtain sensor data as an input, and generate a component scalar based on the sensor data as an output. The digital twin model 550 may be a real-time virtual representation of the component of the component 520 of the vehicle 510.

The database 560 may be a database that is configured to store component scalars that are mapped to component identifiers. For example, a first component identifier ("1") may be mapped to a first component scalar ("A"), a second component identifier ("2") may be mapped to a second component scalar ("B"), etc. The analytics device 540 may correlate the component scalars with corresponding component identifiers, and provide the information to the database 560 for storage.

The network 570 may be a communications network, such as a Local Area Network ("LAN"), Wide Area Network ("WAN"), and/or the Internet.

Figure 6:
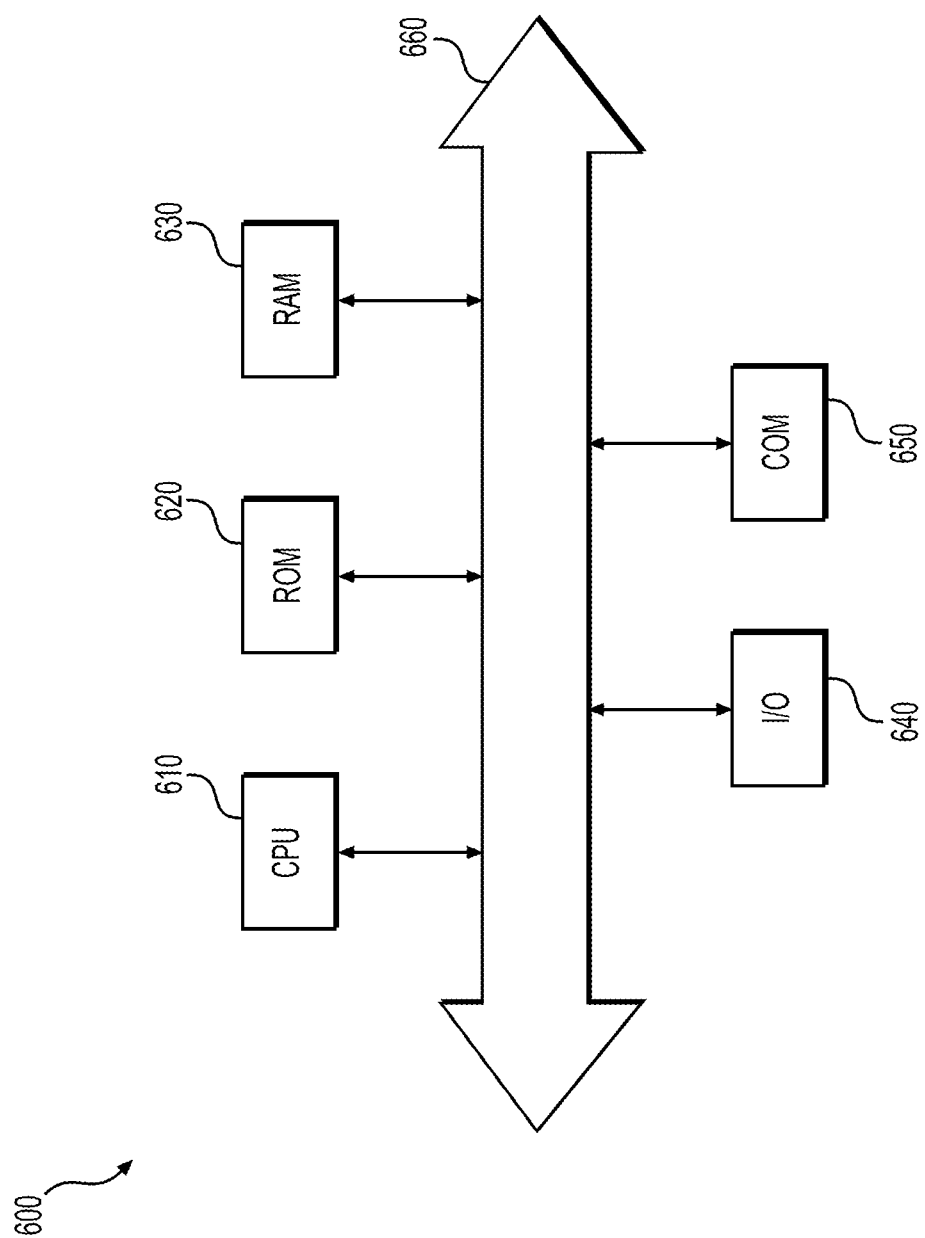
FIG. 6 depicts a diagram of example components of one or more devices of FIG. 5.

FIG. 6 depicts a diagram of example components of one or more devices of FIG. 5. FIG. 6 is a simplified functional block diagram of a computer that may be configured to execute techniques described herein, according to exemplary embodiments of the present disclosure. Specifically, the computer (or "platform" as it may not be a single physical computer infrastructure) may include a data communication interface 650 for packet data communication. The platform also may include a central processing unit ("CPU") 610, in the form of one or more processors, for executing program instructions. The platform may include an internal communication bus 660, and the platform also may include a program storage and/or a data storage for various data files to be processed and/or communicated by the platform such as ROM 620 and RAM 630, although the system 600 may receive programming and data via network communications. The system 600 also may include input and output ports 640 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Figure 7:
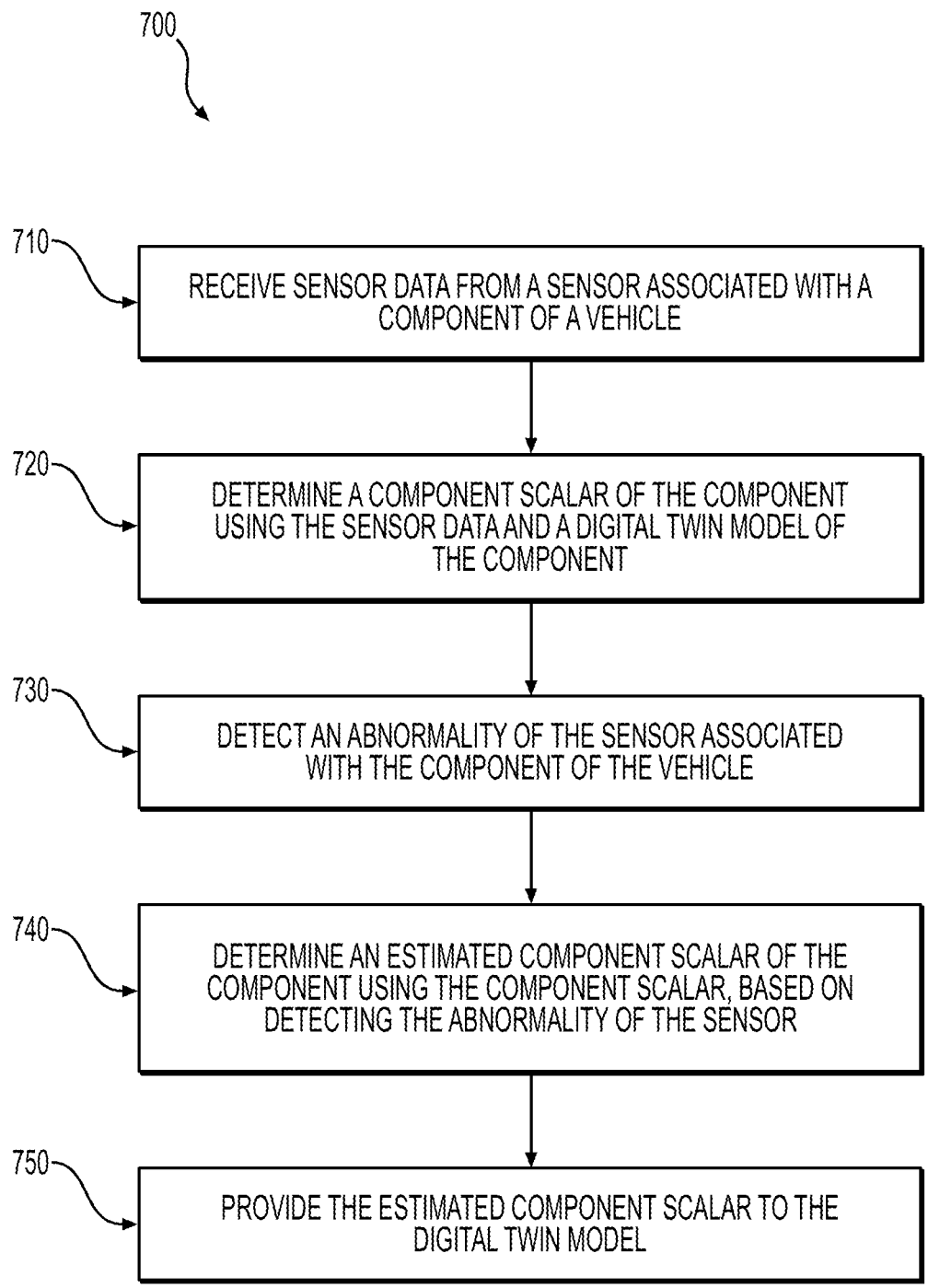
FIG. 7 depicts a flowchart of an example process for determining an estimated component scalar of a component of a vehicle based on detecting an abnormality of a sensor associated with the component of the vehicle.

FIG. 7 depicts a flowchart of an example process 700 for determining an estimated component scalar of a component of a vehicle based on detecting an abnormality of a sensor associated with the component of the vehicle.

As shown in FIG. 7, the process 700 may include receiving sensor data from a sensor associated with a component of a vehicle (operation 710). For example, the analytics device 540 may receive sensor data from a sensor 530 associated with a component 520 of the vehicle 510.

As further shown in FIG. 7, the process 700 may include determining a component scalar of the component using the sensor data and a digital twin model of the component (operation 720). For example, the analytics device 540 may input the sensor data into the digital twin model 550, and determine a component scalar of the component 520 based on an output of the digital twin model 550. As an example, the sensor data may be temperature, and the component scalar may be an efficiency. The analytics device 540 may correlate the component scalar with a component identifier of the component 520, and provide the information to the database 560 for storage.

As further shown in FIG. 7, the process 700 may include detecting a failure of the sensor associated with the component of the vehicle (operation 730). For example, the analytics device 540 may detect an abnormality of the sensor 530. The "abnormality" may refer to a situation in which the sensor 530 is non-operational, non-accurate, non-reliable, etc. For example, the sensor 530 may be abnormal if the sensor 530 is not generating or transmitting sensor data, if the sensor 530 is generating sensor data that is substantially inaccurate, or the like.

The analytics device 540 may detect the abnormality based on detecting that sensor data is not received from the sensor 530. Alternatively, the analytics device 540 may detect the abnormality based on detecting that a particular amount of sensor data is not received from the sensor 530 (e.g., sensor data is not received every second, every five seconds, etc.). Alternatively, the analytics device 540 may detect the abnormality based on determining that a received value of sensor data is different from an expected value of sensor data by a threshold amount. For instance, the analytics device 540 may store information that identifies a particular range of expected values of the sensor data. In this case, the analytics device 540 may determine whether a received value of the sensor data is within a threshold amount of the particular range. The analytics device 540 may use a digital twin model 550 to determine the expected values or the range of expected values.

As further shown in FIG. 7, the process 700 may include determining an estimated component scalar of the component using the component scalar, based on detecting the abnormality of the sensor (operation 740). For example, the analytics device 540 may determine an estimated component scalar of the component 520 based on detecting the abnormality.

The analytics device 540 may determine the estimated component scalar of the component 520 based on one or more values of component scalars stored in the database 560 (e.g., historical component scalar values). For example, the analytics device 540 may obtain the most-recent component scalar, that was determined using sensor data from the normally-operating sensor 530, and determine the estimated component scalar based on the most-recent component scalar. Alternatively, the analytics device 540 may obtain an average value (e.g., a current running average determined using a smoother, a mean, a median, a historical trend, etc.) of the n most-recent component scalars, and determine the estimated component scalar based on the average value.

As further shown in FIG. 7, the process 700 may include providing the estimated component scalar to the digital twin model of the component (operation 750). For example, the analytics device 540 may provide the estimated component scalar to the digital twin model 550 of the component 520.

The digital twin model 550 may receive the estimated scalar component. In some cases, the digital twin model 550 may determine other scalar components based on the estimated scalar component and sensor data. Further, in some cases, the digital twin model 550 may determine a component metric of the component 520 based on the estimated component scalar and an artificial intelligence model. For example, the artificial intelligence model may be configured to receive component scalars (whether determined using sensor data or estimated using previously-determined component scalars), and determine a component metric based on the component scalars. The component metric may be at least one of a fault of the component, a power loss due to the fault of the component, a remaining useful life of the component, or an overall health of the component.

In this way, the digital twin model 550 may more accurately determine a component metric of the component 520 by using an estimated scalar component (instead of a universal component scalar) in the event of an abnormality of a sensor 530. Accordingly, implementations herein improves accuracy of component metric determination, improves the detection of issues with the component 520, improves the safety of the vehicle 510, reduces maintenance associated with the vehicle, etc.

Figure 8:
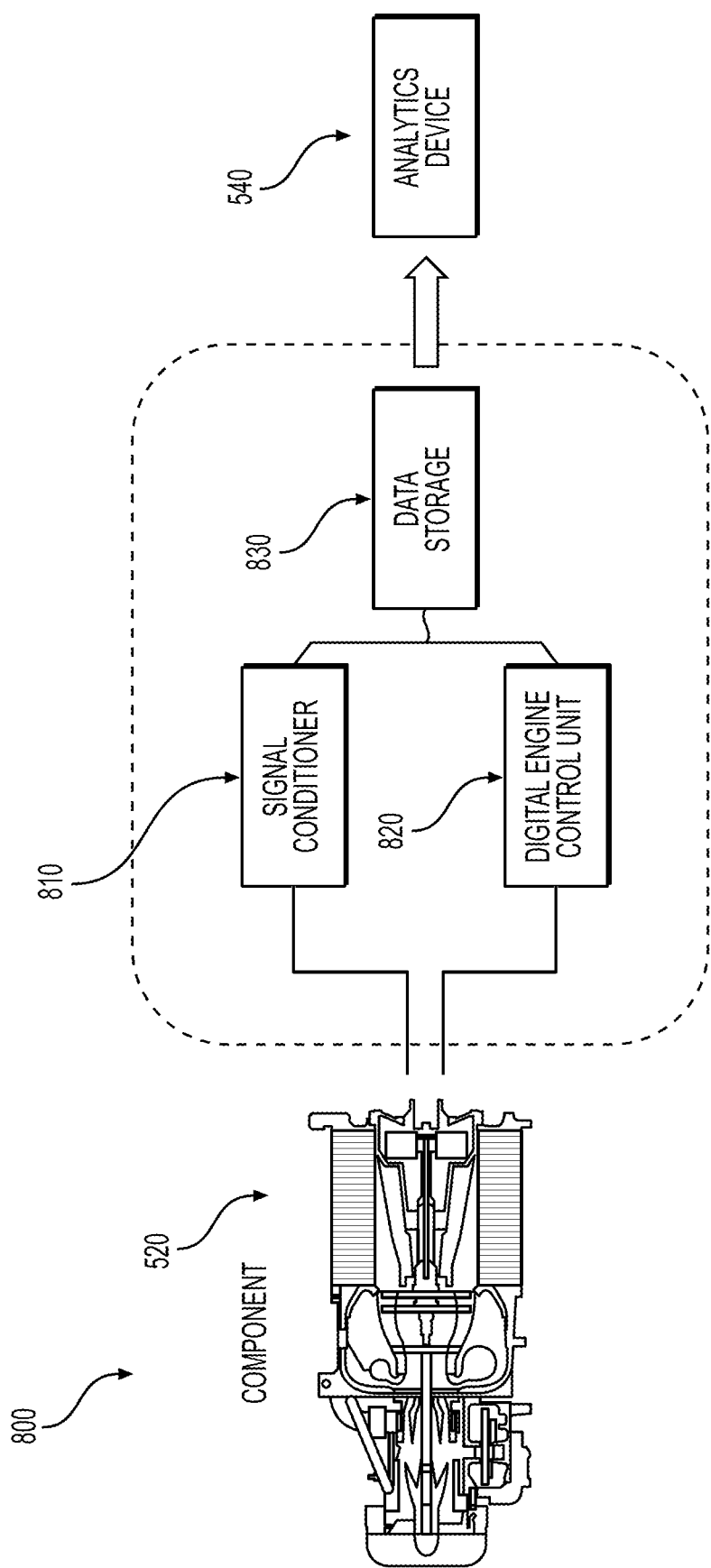
FIG. 8 depicts a diagram of an example vehicle.

FIG. 8 depicts a diagram of an example vehicle. As shown in FIG. 8, the component 520 (i.e., an engine) may include various sensors 530 that output various sensor data (e.g., an engine inlet static pressure, a low-pressure compressor discharge temperature and pressure, a high-pressure compressor discharge temperature and pressure, a power turbine inlet temperature and variable stator position, an output shaft speed, digital engine control unit inlet temperature, an ambient pressure, an inlet plenum static pressure, a low-pressure spool speed, a fuel flow and temperature, a high-pressure spool speed, a digital engine control unit fuel flow, an inlet guide vane angle, etc.). The sensor data may be provided to a signal condition 810 and a digital engine control unit 820. Further, the sensor data may be provided to a data storage 830. Further still, the sensor data may be provided to the analytics device 540 to permit the analytics device 540 to perform one or more operations as described above with respect to FIG. 7.

Figure 9:
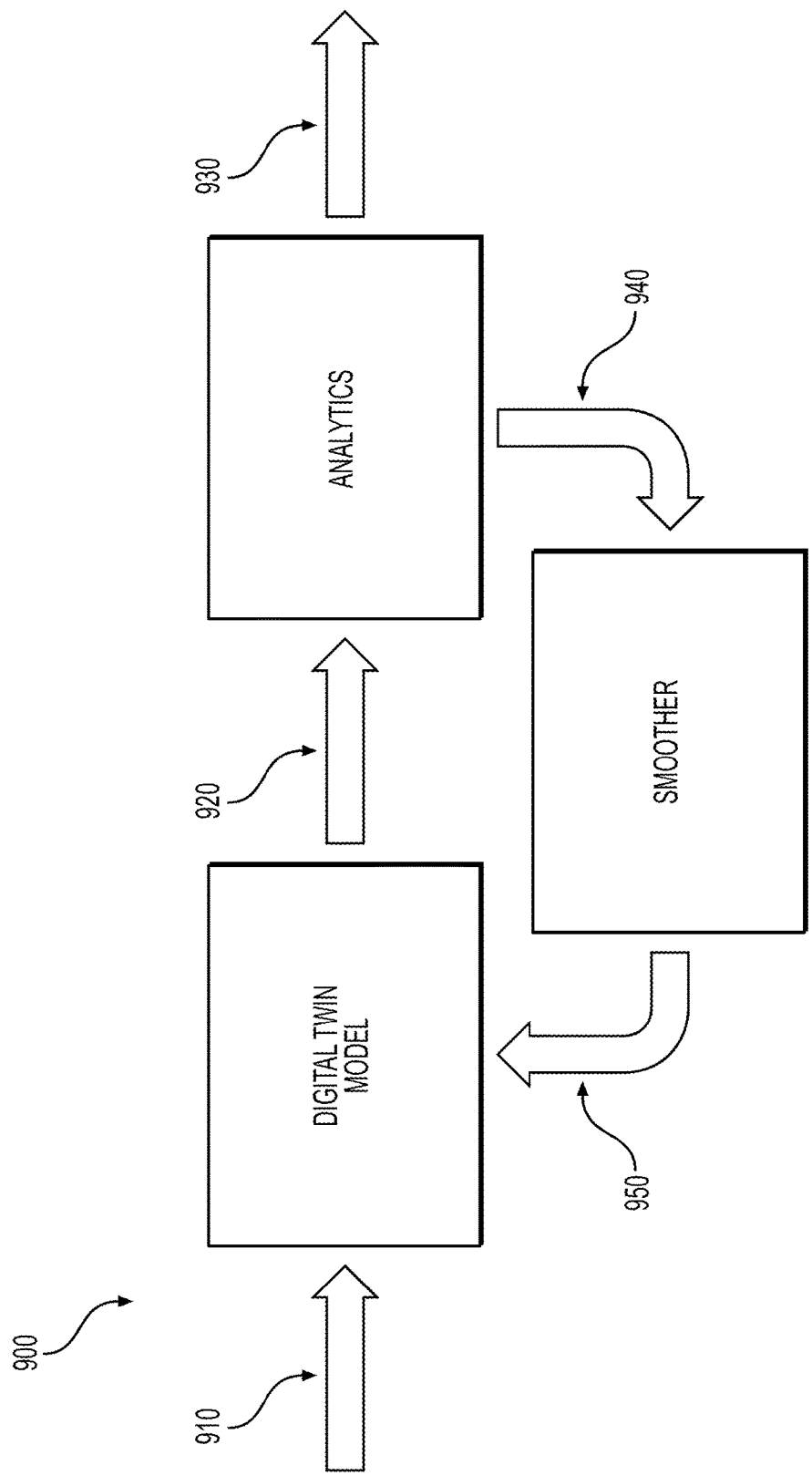
FIG. 9 depicts a diagram of an example process for determining an estimated component scalar of a component of a vehicle based on detecting an abnormality of a sensor associated with the component of the vehicle.

FIG. 9 depicts a diagram of an example process for determining an estimated component scalar of a component of a vehicle based on detecting an abnormality of a sensor associated with the component of the vehicle. As shown in FIG. 9, the analytics device 540 may provide sensor data 910 to the digital twin model 550, which may output a component scalar 920. The analytics device 540 may determine a component metric 930 based on the component scalar 920. Moreover, in the event of an abnormality, the analytics device 540 may provide an estimated component scalar 940 to a smoother, which will provide the smoothed component scalar to the digital twin model 550

Figure 10:
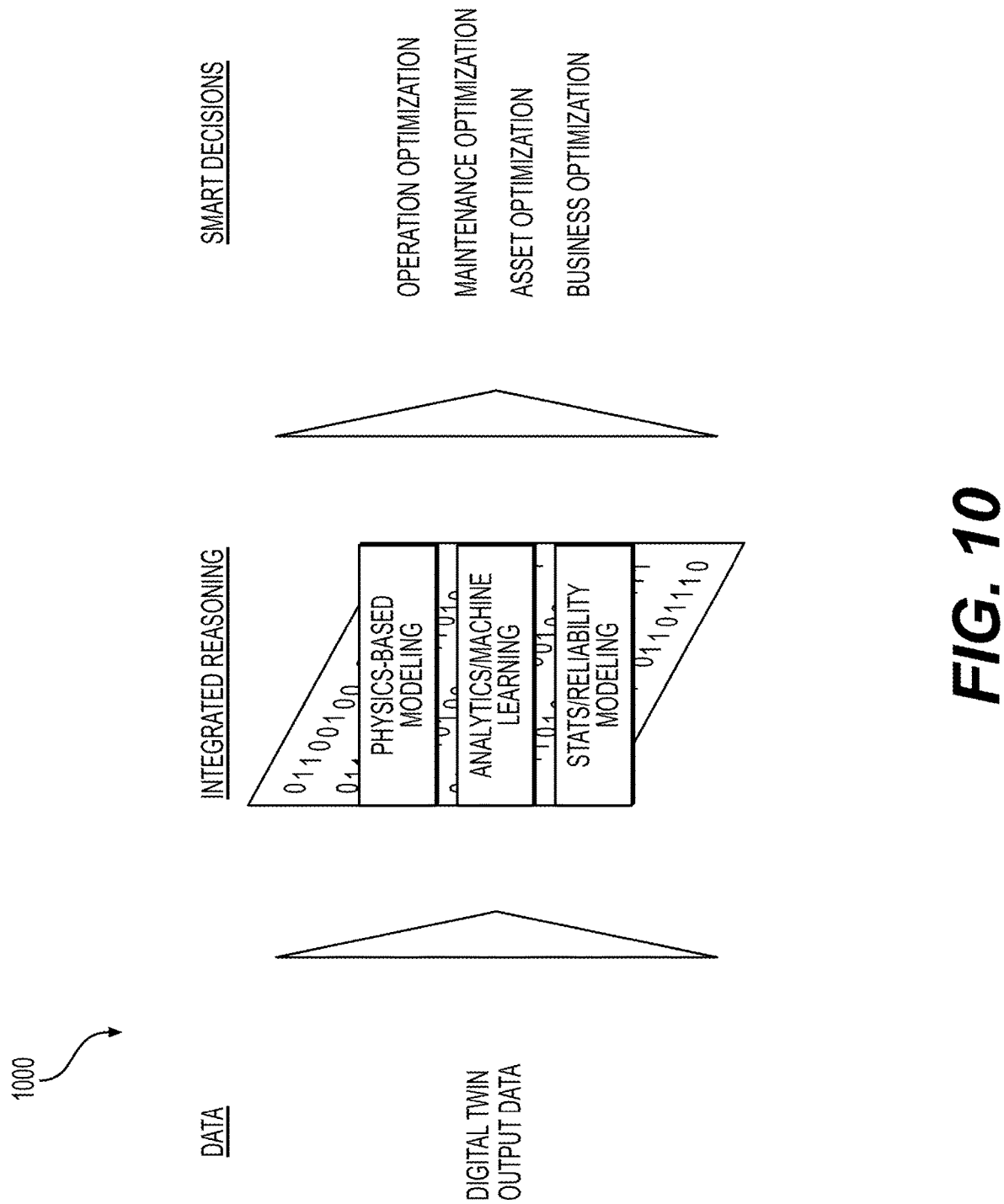
FIG. 10 depicts a diagram of example analytics.

FIG. 10 depicts a diagram of example analytics 1000. As shown in FIG. 10, a model may receive input data (e.g., digital twin model 550 output data) associated with a vehicle 510, apply one or more integrated reasoning techniques (e.g., physics-based modeling, analytics/machine learning, Heuristics modeling, statistics/reliability modeling, data-driven methods, hybrid techniques, etc.), and output smart decisions such as operation optimization, maintenance optimization, asset optimization, business optimization, etc.

The physics-based modeling may include models derived from "first principles," may include models derived from usage based on material properties, and/or may include fault models (failure mode and symptom mapping). The data-driven methods may include methods based on system events and time series data, regression techniques (e.g., least-square, SVM, etc.), mapping/clustering (e.g., NN, SOM, PCA, etc.), deep learning (e.g., CNN, etc.), statistics (e.g., Bayesian, association rules, etc.), or the like. The hybrid techniques may include a combination of modeling and data-driven statistics (e.g., particle filter). The model may start with available data, such as health status checking, data-driven analytics, physics-based performance trending, etc., and utilize physics and domain knowledge in data definition and analytics results validation. The model may provide new edge solutions for additional LRU coverage and enhanced analytics. Moreover, the model may provide developed physics-based modeling in enhancing both the analytics and the service offerings.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

What is claimed is:

1. A method comprising:
   receiving sensor data from a sensor associated with a component of a vehicle;
   determining a component scalar of the component of the vehicle using the sensor data and a digital twin model of the component of the vehicle, wherein the component scalar is a relative indicator of at least an attribute of the component of the vehicle;
   detecting an abnormality of the sensor associated with the component of the vehicle;
   determining an estimated component scalar of the component of the vehicle using the component scalar, based on detecting the abnormality of the sensor; and
   providing the estimated component scalar to the digital twin model of the component of the vehicle.

2. The method of claim 1, further comprising:
   correlating the component scalar and a component identifier of the component of the vehicle;
   storing the component scalar that is correlated with the component identifier in a database; and
   obtaining the component scalar from the database using the component identifier, based on detecting the abnormality of the sensor.

3. The method of claim 1, further comprising:
   inputting the sensor data into the digital twin model, wherein the determining the component scalar comprises determining the component scalar based on an output of the digital twin model.

4. The method of claim 1, wherein the determining the estimated component scalar comprises determining the estimated component scalar using the component scalar and a plurality of other component scalars.

5. The method of claim 1, wherein the estimated component scalar is a current running average of component scalars output by the digital twin model using the sensor data.

6. The method of claim 1, further comprising:
   determining a component metric of the component of the vehicle based on the estimated component scalar and an artificial intelligence model.

7. The method of claim 6, wherein the component metric includes at least one of a fault of the component, a power loss due to the fault of the component, a remaining useful life of the component, or an overall health of the component of the vehicle.

8. A device comprising:
   a memory configured to store instructions; and
   a processor configured to execute the instructions to perform a method comprising:
   receiving sensor data from a sensor associated with a component of a vehicle;
   determining a component scalar of the component of the vehicle using the sensor data and a digital twin model of the component of the vehicle, wherein the component scalar is a relative indicator of at least an attribute of the component of the vehicle;
   detecting an abnormality of the sensor associated with the component of the vehicle;
   determining an estimated component scalar of the component of the vehicle using the component scalar, based on detecting the abnormality of the sensor; and
   providing the estimated component scalar to the digital twin model of the component of the vehicle.

9. The device of claim 8, wherein the method further comprises:
   correlating the component scalar and a component identifier of the component of the vehicle;
   storing the component scalar that is correlated with the component identifier in a database; and
   obtaining the component scalar from the database using the component identifier, based on detecting the abnormality of the sensor.

10. The device of claim 8, wherein the method further comprises:
    inputting the sensor data into the digital twin model, wherein the determining the component scalar comprises determining the component scalar based on an output of the digital twin model.

11. The device of claim 8, wherein the determining the estimated component scalar comprises determining the estimated component scalar using the component scalar and a plurality of other component scalars.

12. The device of claim 8, wherein the estimated component scalar is a current running average of component scalars output by the digital twin model using the sensor data.

13. The device of claim 8, wherein the method further comprises:

determining a component metric of the component of the vehicle based on the estimated component scalar and an artificial intelligence model.

14. The device of claim 13, wherein the component metric includes at least one of a fault of the component, a power loss due to the fault of the component, a remaining useful life of the component, or an overall health of the component of the vehicle.

15. A non-transitory computer-readable medium configured to store instructions that, when executed by a processor, cause the processor to perform a method comprising:
receiving sensor data from a sensor associated with a component of a vehicle;
determining a component scalar of the component of the vehicle using the sensor data and a digital twin model of the component of the vehicle, wherein the component scalar is a relative indicator of at least an attribute of the component of the vehicle;
detecting an abnormality of the sensor associated with the component of the vehicle;
determining an estimated component scalar of the component of the vehicle using the component scalar, based on detecting the abnormality of the sensor; and
providing the estimated component scalar to the digital twin model of the component of the vehicle.

16. The non-transitory computer-readable medium of claim 15, wherein the method further comprises:
correlating the component scalar and a component identifier of the component of the vehicle;
storing the component scalar that is correlated with the component identifier in a database; and
obtaining the component scalar from the database using the component identifier, based on detecting the abnormality of the sensor.

17. The non-transitory computer-readable medium of claim 15, wherein the method further comprises:
inputting the sensor data into the digital twin model, wherein the determining the component scalar comprises determining the component scalar based on an output of the digital twin model.

18. The non-transitory computer-readable medium of claim 15, wherein the determining the estimated component scalar comprises determining the estimated component scalar using the component scalar and a plurality of other component scalars.

19. The non-transitory computer-readable medium of claim 15, wherein the method further comprises:
determining a component metric of the component of the vehicle based on the estimated component scalar and an artificial intelligence model.

20. The non-transitory computer-readable medium of claim 19, wherein the component metric includes at least one of a fault of the component, a power loss due to the fault of the component, a remaining useful life of the component, or an overall health of the component of the vehicle.

* * * * *